(Model.)
J. J. MACKEDON.
SAFETY PLUG AND VALVE FOR BOILER FITTINGS.
No. 256,344. Patented Apr. 11, 1882.
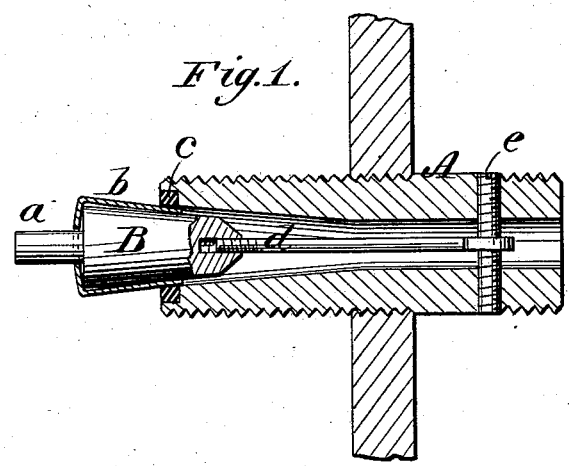
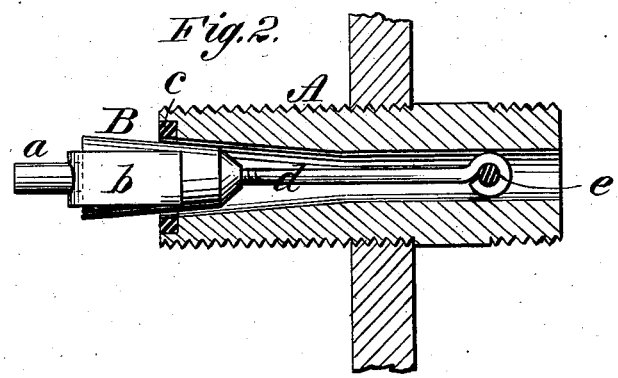
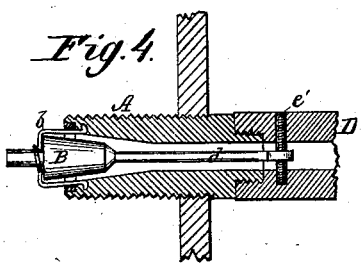
WITNESSES:
Donn Twitchell.
C. Sedgwick
INVENTOR:
J. J. Mackedon
BY
Munn & Co
ATTORNEYS.

UNITED STATES PATENT OFFICE.

JOHN J. MACKEDON, OF OMAHA, NEBRASKA.

SAFETY PLUG AND VALVE FOR BOILER-FITTINGS.

SPECIFICATION forming part of Letters Patent No. 256,344, dated April 11, 1882.

Application filed August 5, 1881. (Model.)

*To all whom it may concern:*

Be it known that I, JOHN J. MACKEDON, of Omaha, Douglas county, Nebraska, have invented a new and Improved Safety Plug and Valve for Boiler-Fittings, of which the following is a specification.

The object of my invention is to prevent injury and loss of life from the breaking off of cocks, valves, pipes, and other devices used in connection with steam-boilers, particularly on locomotives; and the invention consists in a safety plug and valve for use with gage, heater, blow-off, steam-gage and water glass cocks, injectors, throttle, check, pop, and safety valves, and all other cocks, valves, and pipes, for the purpose of automatically cutting off the steam in case such valves or cocks become broken.

In the accompanying drawings, Figure 1 is a longitudinal section of the safety plug and valve. Fig. 2 is a similar section in a plane at right angles to Fig. 1; and Fig. 3 is a side view, partially sectional, of the several parts detached. Fig. 4 is a longitudinal section, showing the cross-pin in the cock or valve that is screwed on the plug.

Similar letters of reference indicate corresponding parts.

A is the tubular plug, formed with an external thread at one end, so that it can be tapped into a boiler-plate in the usual manner, and having also an external thread at the outer end for attachment of the cock or valve. This form is adapted for locomotive-fittings; but for ordinary fittings an internally-threaded socket is required in place of the external thread to allow use of the plug with such fittings. The plug may also be formed with the cock or valve, instead of being separate therefrom. The aperture of plug A is tapered at the inner end to form the valve-seat.

B is the valve, of tapering form, and provided with a stem, *a*, that extends through an aperture in a guide-yoke, *b*. The guide-yoke may be made of wire or a strip of metal, and serves to retain the valve central. It is attached to a ring, *c*, that is fitted in a recess in the end of plug *a*.

To the inner end of valve B is attached a wire, *d*, that extends to near the outer end of plug A, where the wire is formed with an eye. *e* is a screw-pin fitted crosswise of plug A, and passing through the eye of the wire *d*. The valve and wire are adjusted so that the pin retains the valve off its seat at the inner end of plug A. The valve B being thus held open, the ordinary use of the cock or valve attached to plug A is not interfered with.

In case the cock or other fitting attached to plug A is knocked or broken off, the projecting end of plug A will also be broken, and the wire *d* being thus disconnected or released, the steam-pressure will close the valve to its seat; or, in cases of bending, the wire being drawn upon will draw the valve to its seat.

Instead of the valve B being held open by a cross-pin in plug A, the pin may be entered in the cock or valve that is screwed on the plug, as shown in Fig. 4 of the drawings. In this figure, D is a gage-cock screwed on the end of plug A, and *e'* is a pin entering at one side of the cock and passing through the eye of wire *d*, which in this case is long enough to extend entirely through plug A into the cock D. The pin *e'* is put in after the cock has been partially screwed to place, so that when fully in place the valve will be forced open. This gives great facility for the removal of pin *e'* to close the valve B in case the cock is to be taken off.

This safety-valve can be conveniently used to close the plug when it is desired to remove the fitting for any purpose. In that case it is only necessary to remove the pin *e*, when the valve will close.

It is evident that this plug and valve can be applied to steam-pipes, check-valves, and other steam-fittings to prevent escape of steam in case of rupture.

Having thus described my invention, I claim as new and desire to secure by Letters Patent—

1. The safety plug and valve for steam-fittings, consisting of plug A, valve B, wire *d*, and cross-pin *e*, combined for operation substantially as shown and described.

2. The guide *b* and ring *c*, combined with valve B and plug A, substantially as and for the purposes set forth.

JOHN JAMES MACKEDON.

Witnesses:
GEORGE E. EVERETT,
J. M. ROGERS.